Nov. 2, 1965 TOMIJI TARUKAWA Re. 25,892
MIXING APPARATUS
Original Filed Nov. 12, 1959
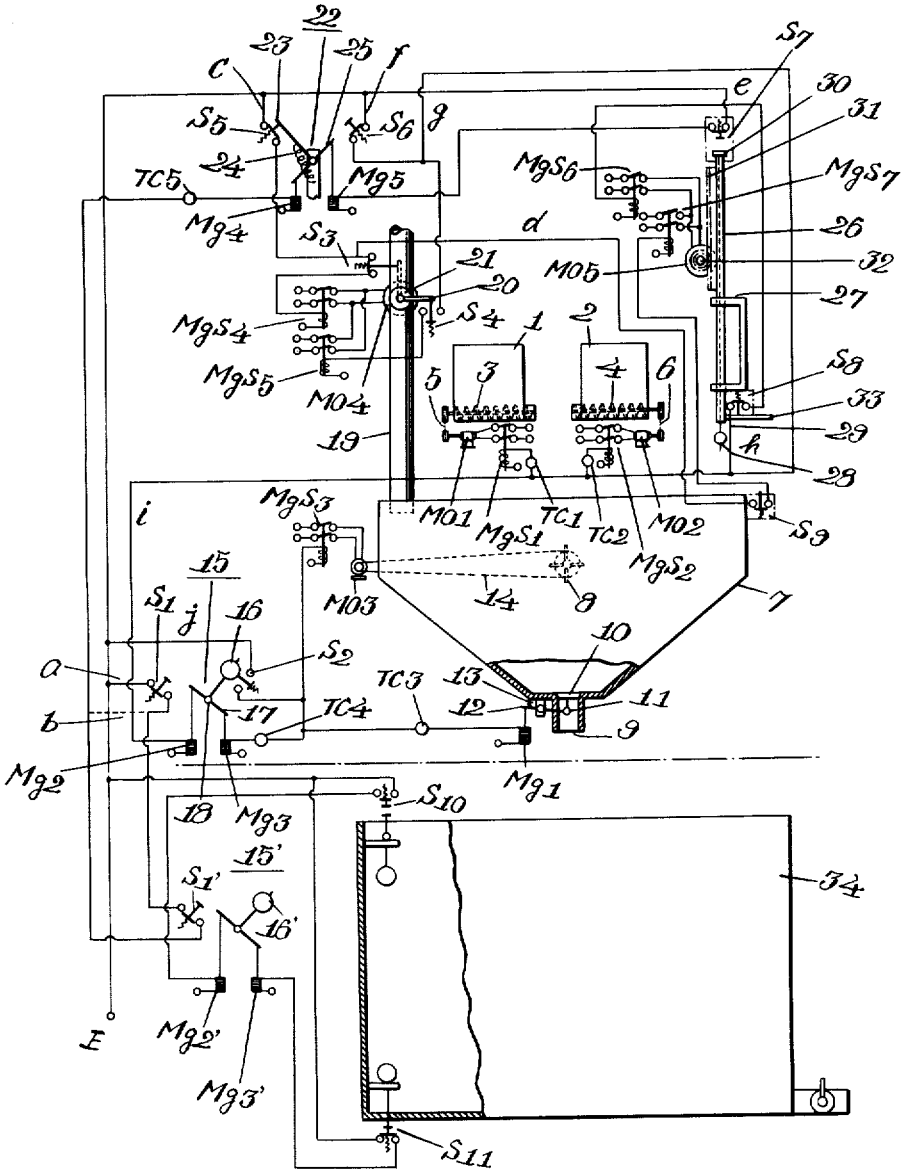

United States Patent Office

Re. 25,892
Reissued Nov. 2, 1965

25,892
MIXING APPARATUS

Tomiji Tarukawa, 51 Higashuyamacho, Tokyo, Japan

Original No. 3,041,049, dated June 26, 1962, Ser. No. 852,369, Nov. 12, 1959. Application for reissue Mar. 13, 1964, Ser. No. 363,317
Claims priority, application Japan, Nov. 15, 1958, 33/32,933
6 Claims. (Cl. 259—9)

Matter enclosed in heavy brackets [ ] appears in the original patent but forms no part of this reissue specification; matter printed in italics indicates the additions made by reissue.

The present invention relates to [an] apparatus *for* automatically [feeding a] *supplying* predetermined [quantity] *quantities* of [a material] *materials* and in particular to [a] mixing [plant] *plants adapted for use in* [with] such [an] apparatus.

A principal object of the present invention is to provide an apparatus which can be automatically fed a predetermined quantity of a material [in] *and which is of* simple construction.

Another object of the present invention is to provide a mixing plant which can automatically mix several kinds of materials and is operated in response to given upper and lower [positions] *levels of materials.*

*The* [Above] *above* and other objects of the present invention [have been] *are* attained by an apparatus which comprises at least one means to [feed] *supply* a predetermined amount of [the] *a* material, said means being provided with a discharge device [so as] *adapted* to discharge only [the] *a* predetermined quantity of the material, a vessel arranged to receive the material discharged from said means, the discharge device of said means being so arranged that the discharge operation of said means will be commenced only upon *there being* the predetermined quantity of the material in said vessel, and a changing mechanism electrically controlling start and stop of the operation of the discharge device.

The present invention may be understood from the following description taken in connection with the accompanying drawing which shows by way of example a preferred embodiment and in which *the sole figure schematically shows* a mixing plant embodying the present invention [is schematically shown].

*In the drawing, elements* 1 and 2 are feeding [device] *devices* or [feeder] *feeders* for required materials, and *elements* 3 and 4 are screw conveyors in said [feeder] *feeders,* which conveyors are driven through belts 5 and 6 by motors MO1 and MO2 respectively. MgS1 and MgS2 are electromagnetic switches by which the motors MO1 and MO2 are operated. TC1 and TC2 are time limit [switch] *switches,* each being set to be closed after operating for a predetermined time and limiting an exciting period of said [switch] *switches* so as to supply a predetermined quantity of a material. *Element* 7 is a vessel including a mixing device 8 arranged under the feeders 1 and 2, an outlet 9 on the bottom of said vessel having a valve 10 with a valve rod connected at 11 with a lever 12 which is provided at the opposite end with a wire connected to an armature of the electromagnet Mg1 and a spring 13 fixed to the bottom of the vessel 7. The mixing device 8 is driven through a belt 14 by a motor MO3 which is started by an electromagnet MgS3 *when the latter is* excited. *Element* 15 is a snap mechanism in which a vertical rod has a weight 16 at the upper end and [the other] *a* horizontal rod 17 is connected at both ends with armatures of electromagnets Mg2 and Mg3 through wires. Said weight 16 is moved either leftward or rightward [round] *around* the pivot 18 as a center by alternate exciting of the electromagnets and the vertical rod is kept in the moved position by said weight. At the [moved] extreme positions are arranged switches S1 and S2 which [is] *are* set to be closed only upon releasing the pressure due to weight 16. TC3 and TC4 are time limit switches which can be operated after a certain time, TC3 being set to regulate [a] mixing time [of] *for* the mixture and TC4 a discharge time thereof. *Element* 19 is a supply pipe [of] *for supplying* a liquid to the vessel 7, which is provided with a valve 21 having an arm 20. Said valve 21 is connected to a rotary shaft of a reversible reduction motor MO4 by which it is open or closed. In the drawing the [state of the closed] valve is shown *closed. Elements* S3 and S4 are limit switches which are arranged at the extreme positions of said arm 20 and are set to be closed only upon releasing [from] *of* said arm 20. When the limit switch S3 is closed the valve 21 is opened and when the limit switch S4 is closed the valve is closed. MgS4 and MgS5 are electromagnetic [switch] *switches* which act to start the motor MO4 in which the rotating direction *caused* by the electromagnetic switch MgS4 [excited being] *is* opposite to that *caused* by the electromagnetic switch MgS5 [excited]. *Element* 22 is a snap mechanism comprising electromagnets Mg4 and Mg5, a rod 23 with a spring 24 attached to a frame and a rod 25 connected at both ends with armatures of the electromagnets Mg4 and Mg5 through wires. S5 and S6 are limit switches which are arranged at the extreme positions of said rod 23 to be closed only when pushed. The vessel 7 may be provided with a liquid level control device. *Element* 26 is a tubular member to be raised from or lowered into the vessel 7 by means of a motor MO5, which is loosely fitted in a supporting frame 27 and into which a supporting rod 29 with a float 28 is inserted to be moved upward and downward. Said float 28 is supported on said tubular member 26 by a stopper 30 integral with the supporting rod 29. A rack 31 fixed on the side of the tubular member 26 meshes with a pinion 32, which is connected at a given position with the rotary shaft of the reversible reduction motor MO5. The rotation of the motor MO5 causes the tubular member to raise or lower. MgS6 and MgS7 are electromagnetic switches which are alternatively excited to start the motor MO5 reversibly. S7 is a switch fixed on the tubular member 26, said switch is controlled by the up and down movements. S8 and S9 are limit switches which are opened by a projecting rod 33 fixed on the side of the tubular member 26 so as to stop the [rising] *raising* and lowering of the latter. TC5 is a time limit switch which is set to regulate an [exciting] *excitation* time of the electromagnet Mg4 and to demagnetize the latter after operation during a certain time. *Element* 34 is a tank for the mixture arranged under the vessel 7, said tank being provided at required positions with floats having switches S10 and S11. When the mixture in the tank 34 reaches an upper level the supply of the mixture is stopped by the float switch S10 and when the mixture is reduced to a lower level the supply is begun by the float switch S11. *Element* 15′ is similar [mechanism as] *to* the snap mechanism 15. Electric connections are shown in the drawing so that operations described hereinafter can be possible. If the tank 34 is not necessary, continuous operations for automatic mixing and discharge are effected by the electric connection as shown by the dotted line *b*.

The operation of the apparatus is now explained. The shown state is such that the mixture has been discharged, the outlet 9 being closed and the weight 16 of the snap mechanism 15 being turned to the side of the switch S2 so that the switch S1 is released from the pressure of the weight 16 so as to be closed. Thus the electric circuit E–a–S1–b–TC5–Mg4 is closed, so that the electromagnet Mg4 is excited and the rod 23 of the snap mechanism 22 is turned to the side of the switch S5 to close the latter.

Accordingly the electric circuit E–c–S5–S3–MgS4 is closed so that the electromagnetic switch MgS4 is excited and thereby the motor MO4 is rotated normally to turn the arm 20 of the valve 21 leftward. When the arm 20 presses the switch S3, said switch is opened so that the electromagnetic switch MgS4 is demagnetized to stop the motor MO4. Thus the valve 21 is opened and the supply of the liquid to the vessel 7 is begun. The electric circuit E–c–S5–d–S9–MgS7 as well as the above electric circuit is closed so that the electromagnetic switch MgS7 is excited and thereby the motor MO5 is rotated normally to begin to lower the tubular member 26 by means of the pinion 32 and the rack 31. Finally the switch S9 is pushed by the projecting rod 33 so as to be opened and thereby the electromagnetic switch MgS7 is demagnetized to stop the motor MO5. Then the tubular member 26 is kept at a predetermined position in the vessel 7. The float 28 is rising together with the liquid level in the vessel 7 as the latter rises gradually and the supporting rod 29 integral with the float also rises along the tubular member 26. As a result the switch S7 is pushed by the stopper 30 so that it is closed. Accordingly the electric circuit E–e–S7–Mg5 is closed so that the electromagnet Mg5 is excited and thereby the rod 23 is turned to the side of the switch S6 to open the switch S5 and close the switch S6. As the switch S4 was released from the pressure of the arm 20 by turning thereof and has been closed, the electric circuit E–f–S6–S4–MgS5 is closed so that the electromagnetic switch MgS5 is excited and thereby the motor MO4 is reversed to turn the arm 20 in the reversed direction. The valve 21 is closed when arm 20 pushed the switch S4 and then the electromagnetic switch MgS5 is demagnetized to stop the motor MO4. That is, the valve 21 is closed to stop the supply of the liquid. Thus [the] *a* predetermined quantity of the liquid is fed to and stored in the vessel 7. The electric circuits E–f–S6–g–TC2–MgS2 and E–f–S6–g–TC1–MgS1 as well as the above circuit are closed so that feeding of the required material, driving of the mixing device and returning of the tubular member 26 to the original position are effected. Thereby the electromagnetic switches MgS2 and MgS1 [is] *are* excited to rotate the motors MO2 and MO1 simultaneously so that the materials are [begun to be] fed into the vessel 7 through the screw conveyors 3 and 4. The electric circuit E–f–S6–g–h–S8–MgS6 as well as above circuits [is] *are* closed so that the electromagnetic switch MgS6 is excited and thereby the motor MO5 is reversed to [rise] *raise* the tubular member 26 [on the] contrary to above case. The electric circuit E–f–S6–g–i–Mg2 as well as above electric circuit [is] *are* closed so that the electromagnet Mg2 is excited to turn the weight 16 of the snap mechanism to the side of the switch S1. Thereby the switch S2 is closed and the electric circuit E–j–S2–MgS3 is closed so that the electromagnet MgS3 is excited to rotate the motor MO3 and the mixing device through the belt 14. As the tubular member 26 rises to push the switch S8 by means of the projecting rod 33 and open the switch S8 and the electromagnetic switch MgS6 is demagnetized, the motor MO5 is stopped so that the tubular member 26 is kept at the given position outside the vessel 7. Since the time limit switches TC1 and TC2 operate during a given time and then are closed in the feeders 1 and 2 for the required materials, the electromagnetic switches MgS1 and MgS2 are demagnetized to stop the motors MO1 and MO2. Accordingly the supply of the materials is stopped so that the predetermined quantities of the materials are fed into the vessel 7 where mixing is effected. When the mixing is effected during a given time the time limit swtch TC3 operates to close the electric circuit E–j–S2–TC3–Mg1 so that the electromagnet Mg1 is excited to lift the valve 10 by lowering the arm end of the lever 12. Thereby the outlet 9 is opened to begin the discharge of the mixture. When the mixture has been discharged out of the vessel 7 and the latter is empty, the time limit switch TC4 in above circuit operates to excite the electromagnet Mg3 so that the weight 16 is returned to the original position. Thereby the switch S1 is closed to open the switch S2 and the electromagnets Mg1 and Mg3 are [demangetized] *demagnetized* so that the valve 10 is closed in the outlet 9 by the force of the spring 13. The supply of the materials and the discharge of the mixture are effected repeatedly and automatically. When the tank 34 of the mixture is arranged as shown in the drawing and the level in the tank is reduced to the predetermined amount, the float switch S11 is closed so that the vertical rod of the snap mechanism 15' is turned rightward to close the switch S1'. Since the electric circuit is closed, the operation described above is continuously effected. When the mixture in the tank 34 reaches a predetermined level the float switch S10 is closed to turn the rod of the snap mechanism 15' to the side of the switch S1' and open the latter. Thereby the above circuit is opened so that the operations of the supply of the materials, mixing, discharging and so on are stopped. When the stored mixtured is discharged and the level in the tank 34 is reduced to the predetermined amount *the* above operations are again repeated continuously.

[The embodiment described and shown is intended merely to exemplify the invention and does not limit it. Various modifications are therefore possible without going beyond the scope of the invention concept. For example, each snap mechanism may comprise one electromagnet and one spring urging reversely an armature thereof, a level control device may be attached directly to the vessel, a float device may be substituted for a two contact switch by which an electric current flows through a liquid, a vessel may be provided with a heater, and a mixing device may be such that mixing is effected by turning a vessel and discharge in kneaded mixture by inclined position thereof.]

What I claim is:

1. Apparatus for automatically feeding a predetermined quantity of material comprising a plurality of devices for feeding material, a vessel operatively positioned with respect to said feeding devices to receive material therefrom, circuit control means including first and second switches, one of said devices being coupled to said switches to start and stop feeding in accordance with the positions of said switches, first and second actuation means coupled to said circuit control means for respectively closing the first and second switches thereof, and electrical control means for controlling the feed of material from said devices, said one device feeding material therefrom with said second switch closed, said electrical control means being responsive to the level of material in said vessel to energize the first actuation means to close the first switch with a predetermined level of material in said vessel to stop feeding of said one feeding device, the other of said devices being coupled to the first switch to feed material into said vessel with the first switch closed, whereby said other devices feed material into said vessel only after a predetermined quantity of material from said one device has been fed into said vessel.

2. Apparatus as claimed in claim 1, wherein said electrical control means is moved to a sensing position in said vessel with the second switch closed, said electrical control means being responsive to the level of material in the vessel to actuate the first actuation means with the level of the material corresponding to a predetermined limit.

3. Apparatus as claimed in claim 1, wherein said vessel is provided with a discharge outlet for discharging material therefrom, said apparatus comprising mixing means in said vessel operatively coupled to the electrical control means and energized in response to closing of the first switch.

4. Apparatus as claimed in claim 1, wherein said circuit control means is coupled to the first and second actuation means so that the circuit control means simultaneously opens the second switch and closes the first switch with a predetermined level of material fed into said vessel from said one device.

*5. Apparatus for automatically mixing several kinds of materials, said apparatus comprising feeding devices for supplying predetermined amounts of materials to be mixed, said predetermined amounts being selected so as to prepare a suitable mixture, each of said feeding devices including a discharge means to discharge only the predetermined amount of the associated material, a mixer arranged to receive the materials discharged from said feeding devices and including a discharge means, the discharge means of said feeding device including an electrically controlled means by which the discharge operation will be commenced only upon the complete discharge of the mixture from said mixer, the discharge means of said mixer including an electric means by which the discharge operation of said mixer will be commenced only upon the completion of a predetermined interval of mixing of the mixture in said mixer, and a tank arranged to receive the mixture discharged from the mixer, said tank being provided with an electric switch means by which the feeding of each of the several materials from the feeding devices is stopped upon a predetermined increase of the amount of mixture in the tank.*

*6. Apparatus for automatically mixing a plurality of materials, said apparatus comprising feeding devices for supplying predetermined amounts of materials to mixed, said feeding devices including discharge means to discharge only the predetermined amounts of said materials, a mixer to receive and form a mixture of the materials discharged from said feeding devices and including a*

*discharge means, the discharge means of said feeding devices including an electrically controlled means by which discharge will be commeced only upon the complete discharge of the mixture from said mixer, the discharge means of said mixer including an electric means by which the discharge from said mixer will be commenced only upon the completion of a predetermined interval of mixing of the mixture in said mixer, and a tank arranged to receive the mixture discharged from the mixer, said tank including an electric switch means by which discharge of the materials from the feeding devices is stopped upon a predetermined increase of the amount of mixture in the tank, the latter said switch means including a first electric switch means by which discharge of each of the materials from the feeding devices is stopped upon a predetermined increase of the amount of mixture in the tank and a second electric switch means by which the discharge of each of the materials from the feeding devices is commenced upon a predetermined decrease of the amount of mixture in the tank.*

References Cited by the Examiner

The following references, cited by the Examiner, are of record in the patent file of this patent or the original patent.

UNITED STATES PATENTS

| | | | |
|---|---|---|---|
| 1,619,356 | 3/27 | Martin | 137—412 |
| 2,858,594 | 11/58 | Eirich et al. | 259—154 X |

WALTER A. SCHEEL, *Primary Examiner.*